(12) United States Patent
Kim et al.

(10) Patent No.: US 8,144,111 B2
(45) Date of Patent: Mar. 27, 2012

(54) LIGHT EMITTING DIODE DRIVING CIRCUIT HAVING VOLTAGE DETECTION

(75) Inventors: Jin Hwan Kim, Gyunggi-do (KR); Nam Kyu Lee, Gyunggi-do (KR); Doo Ho Yoo, Gyunggi-do (KR); Young Jong Yoo, Gyunggi-do (KR)

(73) Assignee: Samsung Electro-Mechanics Co., Ltd., Suwon, Gyunggi-do (KR)

( * ) Notice: Subject to any disclaimer, the term of this patent is extended or adjusted under 35 U.S.C. 154(b) by 767 days.

(21) Appl. No.: 12/251,176

(22) Filed: Oct. 14, 2008

(65) Prior Publication Data

US 2009/0295775 A1 Dec. 3, 2009

(30) Foreign Application Priority Data

Jun. 3, 2008 (KR) ................ 10-2008-0052011

(51) Int. Cl.
G09G 3/36 (2006.01)
(52) U.S. Cl. .......................... 345/102; 345/82
(58) Field of Classification Search .............. 345/102, 345/39–40, 44, 76, 82
See application file for complete search history.

(56) References Cited

U.S. PATENT DOCUMENTS

| | | | | |
|---|---|---|---|---|
| 2002/0003525 A1* | 1/2002 | Hwang | ............ | 345/102 |
| 2006/0139299 A1* | 6/2006 | Tsuchiya | ............ | 345/102 |
| 2007/0001625 A1* | 1/2007 | Kim | ............ | 315/312 |
| 2007/0091036 A1* | 4/2007 | Han et al. | ............ | 345/82 |
| 2010/0327772 A1* | 12/2010 | Lee et al. | ............ | 315/297 |

FOREIGN PATENT DOCUMENTS

| | | | |
|---|---|---|---|
| KR | 10-2007-0049735 A | | 5/2007 |
| WO | WO 2007055519 A1 | * | 5/2007 |

* cited by examiner

*Primary Examiner* — Chanh Nguyen
*Assistant Examiner* — Roy Rabindranath
(74) *Attorney, Agent, or Firm* — Lowe, Hauptman, Ham & Berner, LLP

(57) ABSTRACT

There is provided a driving circuit of a light emitting device. The driving circuit of a light emitting may include: a DC/DC converter converting an input DC voltage into an output DC voltage; a light emitting device block including a plurality of LED groups connected to an output terminal of the DC/DC converter; a current source circuit unit including a plurality of current sources; a voltage detection unit detecting the output DC voltage of the DC/DC converter; a minimum voltage detection unit detecting a minimum voltage among a plurality of voltages between the plurality of LED groups and the plurality of current sources, respectively; and a single comparator including a first non-inverting input terminal receiving the voltage detected by the voltage detection unit, a second non-inverting input terminal receiving the minimum voltage detected by the minimum voltage detection unit, and an inverting input terminal receiving a predetermined reference voltage.

5 Claims, 2 Drawing Sheets

LIGHT EMITTING DIODE DRIVING CIRCUIT HAVING VOLTAGE DETECTION

CROSS-REFERENCE TO RELATED APPLICATIONS

This application claims the priority of Korean Patent Application No. 2008-0052011 filed on Jun. 3, 2008, in the Korean Intellectual Property Office, the disclosure of which is incorporated herein by reference.

BACKGROUND OF THE INVENTION

1. Field of the Invention

The present invention relates to driving circuits of light emitting devices, and more particularly, to a driving circuit of a light emitting device that has a simplified configuration by using one comparator to detect an over voltage generated when a light emitting device is opened, and an over voltage applied to a current source to thereby facilitate the implementation of an integrated circuit.

2. Description of the Related Art

In general, cold cathode fluorescent lamps (CCFL) are used as light sources of backlight units of LCD TVs. Recently, backlight units that use light emitting diodes (LEDs) as light sources have been actively developed.

An LED is generally driven by two methods. One is a switching method by which a switching converter is used to perform voltage conversion for an LED array and control a constant current. The other is a linear method by which a switching converter is used for voltage conversion, and a saturation region of a transistor or a FET is used as a constant current source.

However, in a case of the linear method, which is known to be more cost-efficient than the switching method, a complicated feedback circuit needs to be simplified to increase the efficiency of the constant current switching converter.

A driving circuit of an LED using the linear method according to the related art will be described in brief. According to the related art, the driving circuit includes an LED block as a light source, a DC/DC converter block supplying a driving voltage used to drive the LED, a constant current block causing a predetermined amount of current to flow through the LED, and a feedback block.

The feedback block of the DC/DC converter includes a first feedback circuit and a second feedback circuit. The first feedback circuit detects a voltage by dividing resistance in order to detect the opening of the light emitting diode. The second feedback circuit detects a driving voltage of the LED in order to prevent power loss of a transistor when a voltage is determined by feedback due to an error of the LED and a change in voltage according to temperature when a load is an LED.

At this time, the second feedback circuit determines a driving voltage. The first feedback circuit provides over voltage protection to protect the LED by detecting the opening of the LED or an over voltage of the DC/DC converter.

According to the related art, the LED driving circuit includes the first and second feedback circuits that perform a feedback function and each have an error amplifier, that is, two error amplifiers, which increases the number of components of the driving circuit. Therefore, manufacturing costs are increased, and a control circuit is more susceptible to malfunction.

SUMMARY OF THE INVENTION

An aspect of the present invention provides a driving circuit of a light emitting device that has a simplified configuration by using one comparator to detect an over voltage generated when a light emitting diode is opened, and an over voltage applied to a current source to thereby facilitate the implementation of an integrated circuit.

According to an aspect of the present invention, there is provided a driving circuit of a light emitting device, the driving circuit including: a DC/DC converter converting an input DC voltage into an output DC voltage according to a voltage control signal; a light emitting device block including a plurality of LED groups connected in parallel to an output terminal of the DC/DC converter, the plurality of LED groups each including a plurality of light emitting devices connected in series to each other; a current source circuit unit including a plurality of current sources connected between the plurality of LED groups of the light emitting device block, respectively, and a ground; a voltage detection unit detecting the output DC voltage of the DC/DC converter; a minimum voltage detection unit detecting a minimum voltage among a plurality of voltages between the plurality of LED groups and the plurality of current sources, respectively; and a single comparator including a first non-inverting input terminal receiving the voltage detected by the voltage detection unit, a second non-inverting input terminal receiving the minimum voltage detected by the minimum voltage detection unit, and an inverting input terminal receiving a predetermined reference voltage.

The driving circuit may further include a PWM control unit supplying a PWM control signal as the voltage control signal of the DC/DC converter by an error voltage from the signal comparator.

The minimum voltage detection unit may include a plurality of diodes having cathodes connected between the plurality of LED groups and the plurality of current sources, respectively, and anodes connected to a voltage terminal through a resistor and an output terminal through which the minimum voltage is output.

The single comparator may compare the predetermined reference voltage and one of the voltage, detected by the voltage detection unit, and the minimum voltage, detected by the minimum voltage detection unit, which has a higher level than the other, and output an error voltage therebetween for PWM control.

The current source circuit unit, the minimum voltage detection unit, and the single comparator may be implemented into one integrated circuit.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
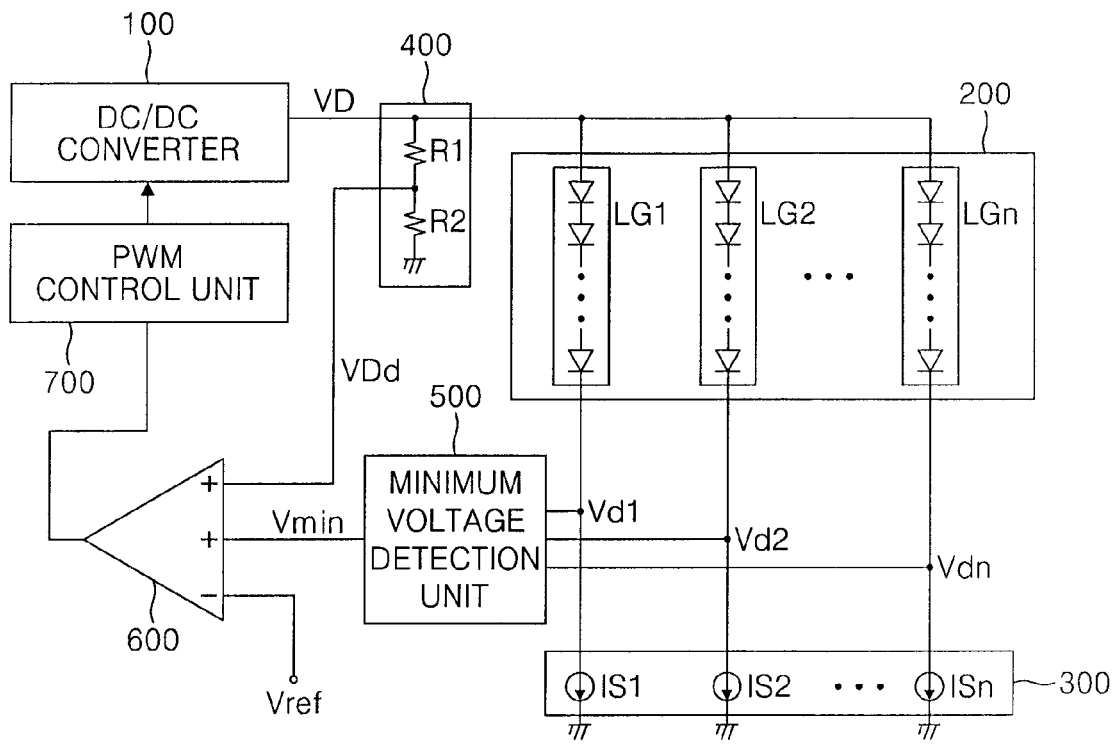
FIG. 1 is a configuration view illustrating a driving circuit of a light emitting device according to an exemplary embodiment of the invention.

Exemplary embodiments of the present invention will now be described in detail with reference to the accompanying drawings.

The invention may however be embodied in many different forms and should not be construed as limited to the embodiments set forth herein. Rather, these embodiments are provided so that this disclosure will be thorough and complete, and will fully convey the scope of the invention to those skilled in the art. Also, in the drawings, the same reference numerals are used throughout to designate the same components.

FIG. 1 is a configuration view illustrating a driving circuit of a light emitting device according to an exemplary embodiment of the invention.

Referring to FIG. 1, a driving circuit of a light emitting device according to an exemplary embodiment of the invention includes a DC/DC converter 100, a light emitting device (LED) block 200, a current source circuit unit 300, a voltage detection unit 400, a minimum voltage detection unit 500, a single comparator 600, and a PWM control unit 700.

The DC/DC converter 100 converts an input DC voltage into an output DC voltage VD according to a PWM control signal. That is, the DC/DC converter 100 switches the input DC voltage and converts the input DC voltage into the output DC voltage by a switching method in response to the PWM control signal.

The light emitting device block 200 includes a plurality of LED groups LG1 to LGn that are connected in parallel to an output terminal of the DC/DC converter 100. Each of the plurality of LED groups LG1 to LGn includes a plurality of light emitting devices connected in series with each other. Here, the light emitting device may be a light emitting diode (LED) or a laser diode (LD).

The current source circuit unit 300 includes a plurality of current sources IS1 to Isn that are connected between the plurality of LED groups LG1 to LGn of the light emitting device block 200, respectively, and a ground.

That is, the current source circuit unit 300 includes a current source IS1, a current source IS2, a current source IS3, and a current source ISn. The current source IS1 is connected between the LED group LG1 of the light emitting device block 200 and the ground. The current source IS2 is connected between the LED group LG2 of the light emitting device block 200 and the ground. The LED group LG3 is connected between the LED group LG3 of the light emitting device block 200 and the ground. The current source ISn is connected between the LED group LGn of the light emitting device block 200 and the ground.

The voltage detection unit 400 divides the output DC voltage VD of the DC/DC converter 100, and detects the divided output. For example, the voltage detection unit 400 includes a first resistor R1 and a second resistor R2 that are connected in series between the output terminal of the DC/DC converter 100 and the ground. The voltage detection unit 400 may output a detection voltage VDd from a connection node between the first resistor R1 and the second resistor R2.

The minimum voltage detection unit 500 detects a minimum voltage Vmin among a plurality of voltages Vd1 to Vdn between the plurality of LED groups LG1 to LGn and the plurality of current sources IS1 to Isn, respectively.

The single comparator 600 includes a first non-inverting input terminal, a second non-inverting input terminal, and an inverting input terminal. The first non-inverting input terminal receives the voltage detected by the voltage detection unit. The second non-inverting input terminal receives the minimum voltage detected by the minimum voltage detection unit. The inverting input terminal receives a predetermined reference voltage.

At this time, the single comparator 600 compares the reference voltage Vref and one of the voltage VDd detected by the voltage detection unit 400 and the minimum voltage Vmin of the minimum voltage detection unit 500 that has a higher level than the other, and outputs an error voltage therebetween for PWM control.

The PWM control unit 700 supplies a PWM control signal as a voltage control signal of the DC/DC converter 100 by the error voltage from the single comparator 600.

Figure 2:
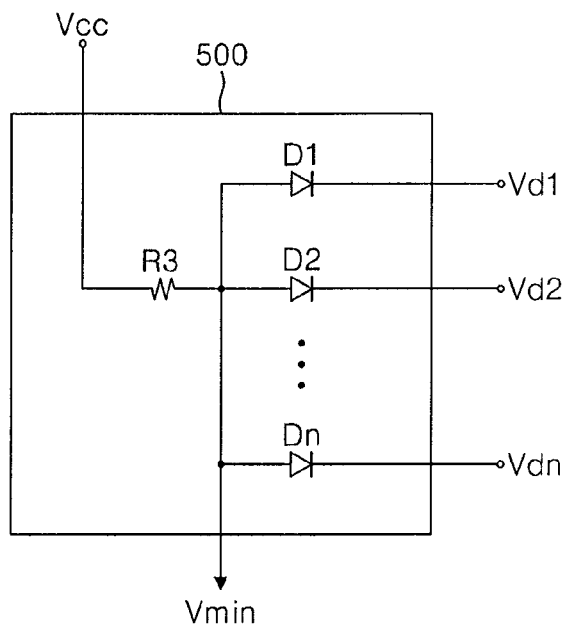
FIG. 2 is a circuit diagram illustrating a minimum voltage detection unit according to an exemplary embodiment of the invention.

FIG. 2 is a circuit diagram illustrating a minimum voltage detection unit according to an exemplary embodiment of the invention.

Referring to FIG. 2, the minimum voltage detection unit 500 may include the plurality of diodes D1 to Dn that have cathodes connected between the plurality of LED groups LG1 to LGn and the plurality of current sources IS1 to Isn, respectively.

Anodes of the plurality of diodes D1 to Dn may be connected to a voltage terminal Vcc through the resistor R3, and at the same time, may be connected to the output terminal through which the minimum voltage Vmin is output.

Figure 3:
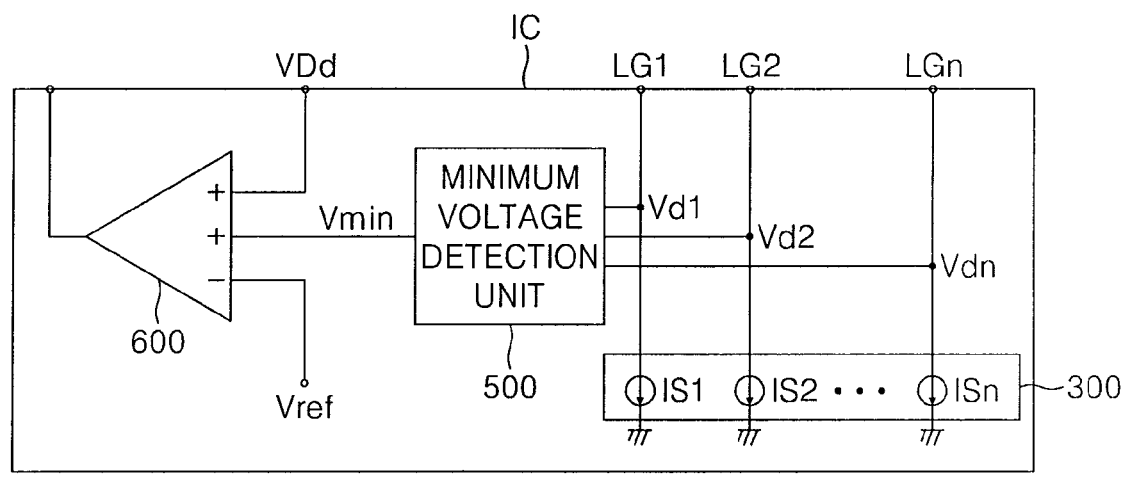
FIG. 3 is a configuration view illustrating an integrated circuit according to an exemplary embodiment.

FIG. 3 is a configuration view illustrating an integrated circuit according to an exemplary embodiment of the invention.

According to the embodiment of the invention, the current source circuit unit 300, the minimum voltage detection unit 500, and the single comparator 600 may be formed into one integrated circuit.

Hereinafter, the operation and effect of the invention will be described in detail with reference to the accompanying drawings.

A driving circuit of a light emitting device according to an exemplary embodiment of the invention will be described with reference to FIGS. 1 to 3. In FIG. 1, the driving circuit of the light emitting device according to the embodiment of the invention includes the DC/DC converter 100, the light emitting device block 200, the current source circuit unit 300, the voltage detection unit 400, the minimum voltage detection unit 500, the single comparator 600, and the PWM control unit 700.

The DC/DC converter 100 switches the input DC voltage according to the PWM control signal by using a switching method, and converts the input DC voltage into the output DC voltage VD. For example, the DC/DC converter 100 may convert an input DC voltage of approximately 2.4V into an output DC voltage VD of approximately 42V.

The light emitting device block 200 includes the plurality of LED groups LG1 to LGn connected in parallel with the output terminal of the DC/DC converter 100. Each of the plurality of LED groups LG1 to LGn is turned on by driving power from the DC/DC converter 100.

Here, the current source circuit unit 300 includes the plurality of current sources IS1 to Isn that supply a predetermined amount of current flow through the plurality of LED groups LG1 to LGn of the light emitting device block 200, respectively.

Here, when the plurality of current sources IS1 to Isn are set to supply the same amount of constant current, the same amount of constant current correspondingly flows through each of the plurality of LED groups LG1 to LGn.

When the voltage detection unit 400 includes the first resistor R1 and the second resistor R2 connected in series between the ground and the output terminal of the DC/DC converter 100, the voltage detection unit 400 divides and detects the output DC voltage VD of the DC/DC converter 100 at the connection node between the first resistor R1 and the second resistor R2, and thus outputs the detection voltage VDd.

As a driving current flows through each of the plurality of LED groups LG1 to LGn, a voltage is applied to each of the plurality of current sources IS1 to Isn. For example, when the DC/DC converter 100 has an output DC voltage VD of 42V, and a voltage of 41V is applied to the LED group LG1 of the light emitting device block 200, a voltage of 1V (Vd1) is applied to the current source IS1. At this time, when a voltage of 40V is applied to the LED group LG2 of the light emitting device block 200, a voltage of 2V (Vd2) is applied to the current source IS2. When a voltage of 39V is applied to the LED GROUP LG3 of the light emitting device block 200, a voltage of 3V (Vd3) is applied to the current source IS3. Finally, when a voltage of 38V is applied to the LED group LGn of the light emitting device block 200, a voltage of 4V (Vd4) is applied to the current source ISn.

At this time, the minimum voltage detection unit 500 detects the minimum voltage Vmin among the plurality of voltages Vd1 to Vdn between the plurality of LED groups LG1 to LGn and the plurality of current sources IS1 to Isn, respectively. For example, as described above, when the plurality of voltages Vd1, Vd2, Vd3, and Vdn are 1V, 2V, 3V, and 4V, respectively, the minimum voltage detection unit 500 detects the voltage Vd1 of 1V as the minimum voltage Vmin.

Referring to FIG. 2, when the minimum voltage detection unit 500 includes the plurality of diodes D1 to Dn that have cathodes connected between the plurality of LED groups LG1 to LGn and the plurality of current sources IS1 to Isn, respectively, the anodes of the plurality of diodes D1 to Dn are connected to the voltage terminal Vcc through the resistor R3, and to the output terminal through which the minimum voltage Vmin is output.

When the voltage terminal Vcc has a voltage of approximately 5V, a voltage of 5V (voltage of the voltage terminal Vcc) is applied to the anodes of the plurality of diodes D1 to Dn, and the voltages of 1V, 2V, 3V, and 4V are applied to the cathodes of the plurality of diodes D1, D2, D3, and Dn, respectively.

At this time, the diode D1 that has the largest voltage difference between both terminals among the plurality of diodes D1 to Dn is turned on. The minimum voltage Vmin is detected by the diode D1 that is turned on. Then, the minimum voltage Vmin is output to the single comparator 600 through the output terminal.

The single comparator 600 receives the voltage VDd detected by the voltage detection unit 400 through the first non-inverting input terminal, the minimum voltage Vmin detected by the minimum voltage detection unit 500 through second non-inverting input terminal, and the predetermined reference voltage Vref through the inverting input terminal. Here, the single comparator 600 compares the predetermined reference voltage Vref and one of the voltage VDd, detected by voltage detection unit 400, and the minimum voltage Vmin, detected by the minimum voltage detection unit 500, which has a higher level than the other, and outputs an error voltage therebetween for PWM control.

For example, when the plurality of LED groups LG1 to LGn are opened, the voltage detection unit 400 detects an over voltage, and the single comparator 600 may detect an over voltage having a higher level than the reference voltage.

Further, when an over voltage is applied to the current source circuit unit 300, the minimum voltage detection unit 500 detects a minimum voltage having a high level. The single comparator 600 correspondingly detects the minimum voltage that has a higher level than the reference voltage. Therefore, the single comparator 600 can detect the over voltage applied to the current source circuit unit 300.

The PWM control unit 700 supplies the PWM control signal as a voltage control signal of the DC/DC converter 100 by the error voltage from the single comparator 600. The DC/DC converter 100 converts the input DC voltage of approximately 2.4V into the output DC voltage VD of approximately 42V according to the PWM control signal, and supplies the driving power to the light emitting device block 200.

As shown in FIG. 3, the single comparator 600 according to the embodiment of the invention is composed of one comparator as described above. The current source circuit unit 300 and the minimum voltage detection unit 500, and the single comparator 600 may be formed into one integrated circuit.

Therefore, the driving circuit of the light emitting device according to the embodiment of the invention can be manufactured at low cost, and the size of the driving circuit of the light emitting device can be reduced.

As described above, in the embodiment of the invention, a single comparator is used in order to detect an over voltage generated when a light emitting diode is opened, and an over voltage applied to a current source, a driving circuit of a light emitting device can be simply implemented to thereby facilitate the implementation of an integrated circuit, manufacturing costs can be reduced because of a reduced number of circuit components, and an interface can be simplified when a DC/DC converter and a constant current circuit are separated from each other.

As set forth above, according to the exemplary embodiment of the invention, in a driving circuit of a light emitting device that can be applied to a lighting apparatus or a backlight unit, a single comparator is used to detect an over voltage generated when the light emitting diode is opened and an over voltage applied to a current source, such that the driving circuit has a simplified configuration to facilitate the implementation of an integrated circuit.

While the present invention has been shown and described in connection with the exemplary embodiments, it will be apparent to those skilled in the art that modifications and variations can be made without departing from the spirit and scope of the invention as defined by the appended claims.

What is claimed is:

1. A light emitting diode (LED) driving circuit, the driving circuit comprising:
   a DC/DC converter converting an input DC voltage into an output DC voltage according to a voltage control signal;
   a light emitting device block including a plurality of LED groups connected in parallel to an output terminal of the DC/DC converter, the plurality of LED groups each including a plurality of light emitting devices connected in series to each other;
   a current source circuit unit including a plurality of current sources connected between the plurality of LED groups of the light emitting device block, respectively, and a ground;
   a voltage detection unit detecting the output DC voltage of the DC/DC converter;
   a minimum voltage detection unit detecting a minimum voltage among a plurality of voltages between the plurality of LED groups and the plurality of current sources, respectively; and
   a single comparator including a first non-inverting input terminal receiving the voltage detected by the voltage detection unit, a second non-inverting input terminal receiving the minimum voltage detected by the minimum voltage detection unit, and an inverting input terminal receiving a predetermined reference voltage.

2. The LED driving circuit of claim 1, further comprising a pulse width modulation control unit supplying a pulse width modulation control signal as the voltage control signal of the DC/DC converter by an error voltage from the signal comparator.

3. The LED driving circuit of claim 1, wherein the minimum voltage detection unit comprises a plurality of diodes having cathodes connected between the plurality of LED groups and the plurality of current sources, respectively, and anodes connected to a voltage terminal through a resistor and an output terminal through which the minimum voltage is output.

4. The LED driving circuit of claim 1, wherein the single comparator compares the predetermined reference voltage and one of the voltage, detected by the voltage detection unit, and the minimum voltage, detected by the minimum voltage detection unit, which has a higher level than the other, and outputs an error voltage therebetween for pulse width modulation control.

5. The LED driving circuit of claim 1, wherein the current source circuit unit, the minimum voltage detection unit, and the single comparator is implemented into one integrated circuit.

* * * * *